United States Patent [19]

Funyu

[11] Patent Number: 4,935,890
[45] Date of Patent: Jun. 19, 1990

[54] FORMAT CONVERTING CIRCUIT FOR NUMERIC DATA

[75] Inventor: Masami Funyu, Tokyo, Japan

[73] Assignee: Kabushiki Kaisha Toshiba, Kawasaki, Japan

[21] Appl. No.: 293,128

[22] Filed: Jan. 3, 1989

[30] Foreign Application Priority Data

Jan. 18, 1988 [JP] Japan .................................. 63-7034

[51] Int. Cl.⁵ .............................................. G06F 7/00
[52] U.S. Cl. .................................. 364/715.03; 341/93
[58] Field of Search ...................... 364/715.03; 341/93

[56] References Cited

U.S. PATENT DOCUMENTS

| | | |
|---|---|---|
| 3,786,490 | 1/1974 | Hallock ............................ 341/93 X |
| 3,855,459 | 12/1974 | Hakata ........................ 364/715.03 X |
| 4,038,538 | 7/1977 | Semmelhaack et al. .......... 341/93 X |
| 4,520,347 | 5/1985 | Campbell, Jr. ......................... 341/93 |
| 4,623,872 | 11/1986 | Rainer ............................... 341/93 X |
| 4,709,226 | 11/1987 | Christopher ........................... 341/93 |

OTHER PUBLICATIONS

Elliott et al., "Two's Complementor or Straight-Through Logic Arrangement,"IBM Tech. Discl. Bull., vol. 12, No. 11, 4/70, pp. 1978-1979.

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

A format converting circuit for numeric data comprises an operation unit which operates according to a mode decision signal to output an input data as it is or a two's complement of the input data; a storage device which stores a positive or negative sign data to be read out and is reset by an initializing signal to a positive data storing state; and a control circuit which operates in two conversion modes. One of the modes is a signed-to-unsigned conversion mode in which the control circuit controls the operation unit with the mode decision signal such that, if a sign bit of the input data is 0, the operation unit outputs the data as it is while, if the sign bit is 1, the operation unit outputs a two's complement of the input data. At the same time, the control circuit inverts the data stored in the storage device if the above-mentioned sign bit is 1. The other mode is an unsigned-to-signed conversion mode in which the control circuit controls the operation unit with the mode decision signal such that, if the data stored in the storage device is positive, the operation unit outputs the input data as it is while, if the data stored in the storage device is negative, the operation unit outputs a two's complement of the input data.

10 Claims, 7 Drawing Sheets

FIG. 1

$$1234/-567=-2 \cdots\cdots \overset{\text{REMAINDER}}{100} \text{(DECIMAL NOTATION)}$$

$$04D2(H)/FDC9(H)=FFFE(H) \cdots\cdots \overset{\text{REMAINDER}}{0064(H)}$$

(HEXADECIMAL NOTATION; NEGATIVE
NUMBER IS EXPRESSED WITH
TWO'S COMPLEMENT)

|  | SIGNED NUMBER | UNSIGNED NUMBER |
|---|---|---|
| DIVIDEND | 04D2 (H) | 04D2 (H) |
| DIVISOR | FDC9 (H) | 0237 (H) |

|  | UNSIGNED NUMBER | SIGNED NUMBER |
|---|---|---|
| QUOTIENT | 0002 (H) | FFFE (H) |
| REMAINDER | 0064 (H) | 0064 (H) |

| DIVISOR | DIVIDEND | QUOTIENT | REMAINDER |
|---------|----------|----------|-----------|
| + | + | + | + |
| + | − | − | − |
| − | + | − | + |
| − | − | + | − |

+ ; POSITIVE
− ; NEGATIVE

FIG.7

| INPUT DATA | | VALUE OF F/F CIRCUIT | | | |
|---|---|---|---|---|---|
| DIVISOR | DIVIDEND | ① | ② | ③④ | ⑤ |
| + | + | 0 | 0 | 0 | 0 |
| + | − | 0 | 0 | 1 | 1 |
| − | + | 0 | 1 | 1 | 1 |
| − | − | 0 | 1 | 0 | 0 |

+ ;POSITIVE
− ;NEGATIVE

FIG.8

| INPUT DATA | | VALUE OF F/F CIRCUIT | | | | |
|---|---|---|---|---|---|---|
| DIVISOR | DIVIDEND | ① | ② | ③④ | ⑤ | ⑥ |
| + | + | 0 | 0 | 0 | 0 | 0 |
| + | − | 0 | 0 | 1 | 1 | 1 |
| − | + | 0 | 1 | 1 | 0 | 0 |
| − | − | 0 | 1 | 0 | 1 | 1 |

+ ;POSITIVE
− ;NEGATIVE

FORMAT CONVERTING CIRCUIT FOR NUMERIC DATA

BACKGROUND OF THE INVENTION

1. Field of the Invention

The present invention relates to a logic circuit for converting the format of numeric data, and particularly to a format converting circuit for converting unsigned numeric data into signed numeric data and signed numeric data into unsigned numeric data.

2. Description of the Prior Art

Generally, the multiplication or the division of signed numbers (the most significant bit of each of the signed numbers represents a sign, and a negative number is represented with a two's complement of the number) is carried out by converting the signed numbers into unsigned numbers (absolute values). An unsigned result of the multiplication or the division is converted into a signed number according to a decision rule.

FIG. 1 shows an example of the conversion. If a multiplier and a multiplicand in a multiplication operation have the same sign, the sign of a product of the multiplication will be positive and, if they have different signs, it will be negative. Therefore, in converting an unsigned product into a signed number, it is necessary only to see whether or not a multiplier and a multiplicand have the same sign.

On the other hand, the signs of a quotient and a remainder in a division operation are determined according to separate rules as shown in FIG. 2. Therefore, in converting an unsigned quotient and an unsigned remainder into signed numbers, it is necessary to see not only whether or not the signs of a divisor and a dividend are the same but also what the sign of the dividend is.

To cope with them, a conventional converting circuit shown in FIG. 3 uses two flip-flop circuits 1 and 3 for storing the signs of numeric data shown in FIG. 2.

In converting a signed number into an unsigned number with this circuit, a conversion mode instruction signal is given to a control circuit 7 to specify a signed-to-unsigned conversion mode. Under this mode, if a sign bit of the signed number is 0, an adder 5 outputs the number as it is while, if the sign bit is 1, the adder 5 calculates and outputs a two's complement of the number. In addition, the sign bits of numeric data are stored in the flip-flops 1 or 3, according to the conversion mode instruction signal.

In converting an unsigned operation result into a signed number, the conversion mode instruction signal instructs the control circuit 7 an unsigned-to-signed conversion mode as well as informing the control circuit 7 of whether the unsigned operation result is a quotient (or a product) or a remainder.

If it is the quotient (or the product), an exclusive OR of sign bits stored in the flip-flops 1 and 3 determines an operation mode of the adder 5. Namely, if the exclusive OR is 0, the adder 5 outputs the quotient (or the product) as it is and, if it is 1, the adder 5 outputs a two's complement of the quotient (or the product).

If it is the remainder, a sign bit (indicating the sign of a dividend) stored in the flip-flop 3 determines an operation mode of the adder 5. If the sign bit is 0, the adder 5 outputs the remainder as it is and, if it is 1, the adder 5 outputs a two's complement of the remainder.

As described in the above, the conventional converting circuit stores the signs of two numeric data separately, and uses them to determine the sign of an operation result. Due to this, the conventional circuit has drawbacks mentioned below.

Two flip-flops shall be arranged to store the sign bits of two input data, respectively.

In converting signed numbers into unsigned numbers, it is necessary to distinguish two numeric data from each other and store the sign bits of them in corresponding flip-flops. In converting an unsigned number into a signed number, it is necessary to specify whether the unsigned number is a quotient (or a product) or a remainder to determine the sign thereof. Therefore, two signal lines shall be prepared for sending conversion mode instruction signals to complicate a control circuit.

Further, in controlling the control circuit with a microinstruction, at least two bits in an operation code field of the microinstruction are needed.

SUMMARY OF THE INVENTION

An object of the present invention is to provide a format converting circuit for numeric data, having a simple constitution compared to that of a conventional circuit.

In order to accomplish the object mentioned in the above, the present invention provides a format converting circuit for numeric data, comprising an operation means which operates according to a mode decision signal to output an input data as it is or a two's complement of the input data; a storage means which stores a positive or negative sign data to be read out and is reset by an initializing signal to a positive sign data possessing state; and a control means which operates in two conversion modes.

One of the modes is a signed-to-unsigned conversion mode in which the control means sends the mode decision signal to the operation means to control it such that, if the sign bit of an input numeric data to the operation means is 0, the operation means passes the numeric data as it is while, if the sign bit is 1, the operation means calculates and outputs a two's complement of the numeric data. At the same time, in the signed-to-unsigned conversion mode, the control means inverts a value in the storage means, if the above-mentioned sign bit is 1.

The other mode is an unsigned-to-signed conversion mode in which the control means sends the mode decision signal to the operation means to control it such that, if the value stored in the storage means is positive, the operation means outputs in inputted data as it is while, if the value stored in the storage means is negative, the operation means outputs a two's complement of the inputted data.

To convert a signed multiplier and multiplicand or divisor and dividend into unsigned numbers, the control means is set to the signed-to-unsigned conversion mode before inputting the numeric data.

To convert an unsigned quotient or an unsigned product into a signed number, the control means is set to the unsigned-to-signed conversion mode before inputting the quotient or the product.

To convert an unsigned remainder into a signed number, the control means is firstly set to the signed-to-unsigned conversion mode to input a divisor. Then, the control means is set to the unsigned-to-signed conversion mode to input the remainder.

The format converting circuit of numeric data according to the present invention with the above-mentioned arrangement has advantages mentioned below.

In converting signed numbers into unsigned numbers, a positive sign data is stored in the storage means if an exclusive OR of the sign bits of two numeric data is 0 (i.e., the sign bits are equal to each other), while a negative sign data is stored in the storage means if the exclusive OR of the sign bits is 1 (i.e., the sign bits are different from each other). Therefore, only one flip-flop for storing the sign bits is needed.

In converting signed numbers into unsigned numbers, two numeric data are not needed to be distinguished from each other. In addition, in converting an unsigned number into a signed number, it is not necessary to designate whether an input data is a quotient (or a product) or a remainder. Therefore, only one line for the conversion mode instruction signed is needed in selecting an operation mode. Further, a control circuit will be simplified.

These and other objects, features and advantages of the present invention will be more apparent from the following detailed description of preferred embodiments in conjunction with the accompanying drawings.

BRIEF DESCRIPTION OF THE DRAWINGS

FIG. 1 is a view showing an example of converting signed numbers into unsigned numbers and converting unsigned numbers into signed numbers;

FIG. 7 is a table showing values to be stored in a flip-flop at respective clock cycles of the converting operation shown in FIG. 5;

FIG. 8 is a table showing values to be stored in the flip-flop at respective clock cycles of the converting operation shown in FIG. 6;

DETAILED DESCRIPTION OF THE PREFERRED EMBODIMENTS

Figures 2, 3:
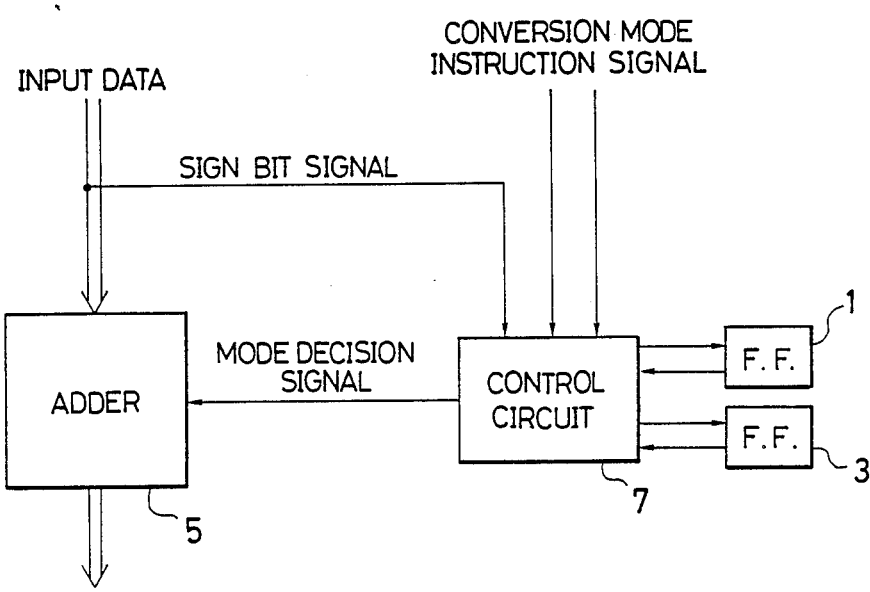
FIG. 2 is a view showing relations between the signs of quotients and remainders and the signs of divisors and dividends.
FIG. 3 is a format converting circuit of numeric data according to a prior art.
Figure 4:
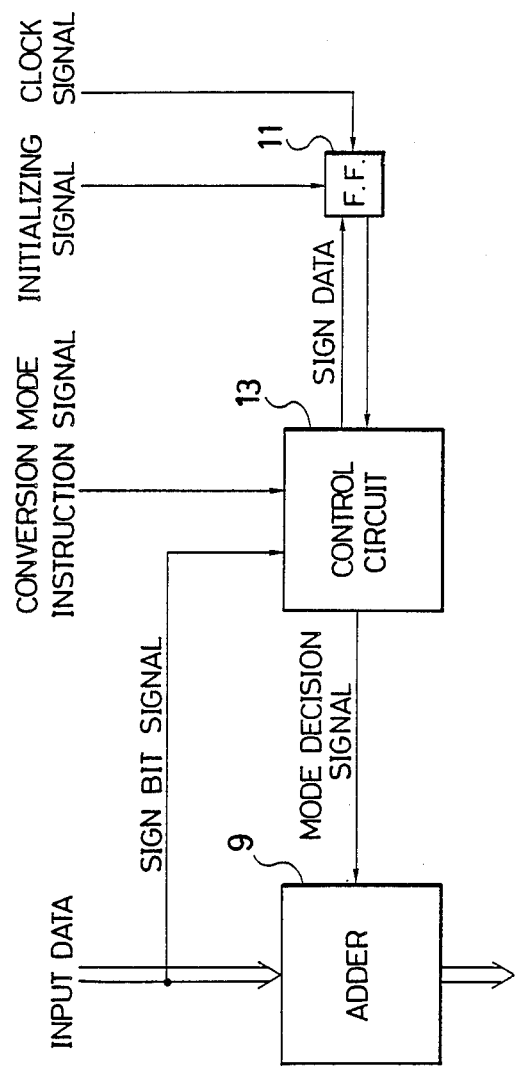
FIG. 4 is a view showing the constitution of a format converting circuit of numeric data according to an embodiment of the present invention.

FIG. 4 is a view showing a format converting circuit of numeric data according to an embodiment of the present invention.

The format converting circuit has an adder 9. The adder 9 operates according to a mode decision signal from a control circuit 13 to output an input number as it is (a through mode) or to output a two's complement of the input number (a complement mode).

A flip-flop 11 stores a sign data from the control circuit 13, and latches an input signal in synchronism with a clock signal. The flip-flop circuit 11 is reset to 0 by an initializing signal.

The control circuit 13 is put, according to a conversion mode instruction signal, in a signed-to-unsigned conversion mode or to an unsigned-to-signed conversion mode.

Under the signed-to-unsigned conversion mode, the control circuit 13 puts the adder 9 in the through mode if the sign bit of a numeric data inputted to the adder 9 is 0, and puts the adder 9 in the complement mode if the sign bit is 1. At the same time, the control circuit 13 finds an exclusive OR of the sign bit of the input data with respect to a sign data stored in the flip-flop 11, and transfers the exclusive OR to the flip-flop 11. Therefore, if the sign of the input data is 0, the value of the flip-flop 11 will not be changed and, if the sign bit of the input data is 1, the value of the flip-flop 11 will be inverted.

In the unsigned-to-signed conversion mode, the control circuit 13 puts the adder 9 in the through mode to pass an input numeric data as it is if a value stored in the flip-flop 11 is 0, and puts the adder 9 in the complement mode to output a two's complement of the input data if the value of the flip-flop 11 is 1.

How this converting circuit converts signed operation data into unsigned numbers, and an unsigned operation result into a signed number will be explained.

Figure 5:
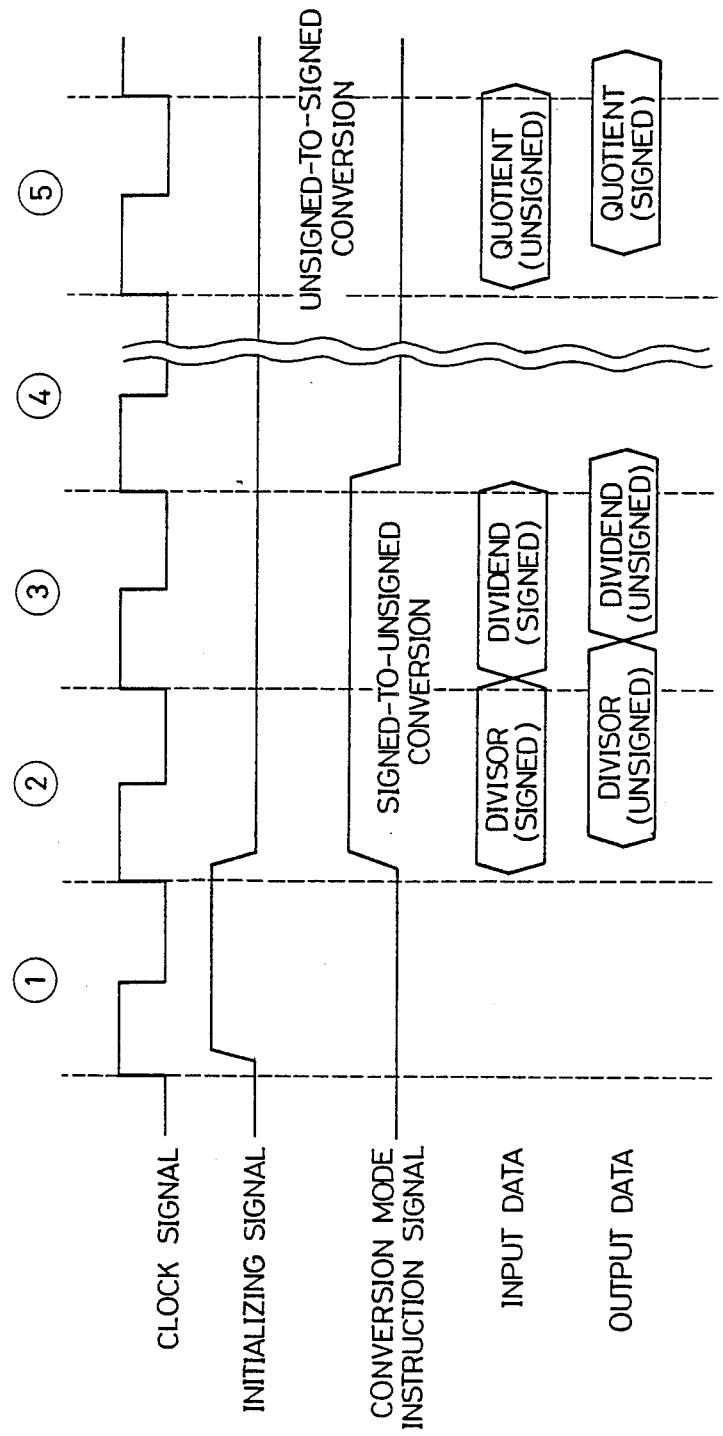
FIG. 5 is a timing chart showing the converting operation of the converting circuit of FIG. 4, in finding a quotient of division.

FIG. 5 is a timing chart in finding a quotient of division, and FIG. 7 shows values to be stored in the flip-flop 11 at respective cycles of the converting operation.

In a first clock cycle ①, an initializing signal is set to HIGH to reset the flip-flop 11 to 0 as shown in a column ① of the table of FIG. 7.

In the next clock cycle ②, a conversion mode instruction signal specifying the signed-to-unsigned conversion mode is sent to the control circuit 13, and a numeric data of divisor is inputted to the adder 9. According to the above-mentioned function of the control circuit 13, the input numeric data is outputted as it is from the adder 9 if a sign bit of the inputted data is 0, and a two's complement of the inputted numeric data is outputted from the adder 9 if the sign bit is 1. At the same time, if the sign bit is 0, a status of the flip-flop 11 will not be changed while, if the sign bit is 1, the status of the flip-flop 11 will be inverted. Namely, as shown in a column ② of the table of FIG. 7, the flip-flop 11 will be 1 if the sign bit of the divisor is negative.

In the next clock cycle ③, a dividend is inputted. Similar to the case of the divisor, the inputted number is outputted as it is if a sign bit of the inputted number is 0, and a two's complement of the inputted number is outputted if the sign bit is 1. Further, if the sign bit is 0, the status of the flip-flop 11 will not be changed while, if the sign bit is 1, the status of the flip-flop 11 will be inverted. As a result, as shown in a column ③ of FIG. 7, the flip-flop 11 will be 0 if the divisor and dividend have the same sign, and the flip-flop 11 will be 1 if the divisor and dividend have different signs, respectively. Namely, an exclusive OR of the sign bits of the divisor and, dividend is stored in the flip-flop 11.

After the signed divisor and dividend are converted into unsigned numbers, the conversion mode instruction signal is set to LOW in the next clock cycle ④ to put the converting circuit in the unsigned-to-signed conversion mode. During this clock cycle, a division operation is executed according to the unsigned divisor and dividend.

Then, an unsigned quotient is inputted in the next cycle ⑤. The inputted quotient is outputted as it is if the status of the flip-flop 11 is 0, while a two's complement of the inputted quotient is outputted if the status of the flip-flop 11 is 1, thus converting the quotient into a signed number.

Next, a way for finding a remainder will be explained.

Figure 6:
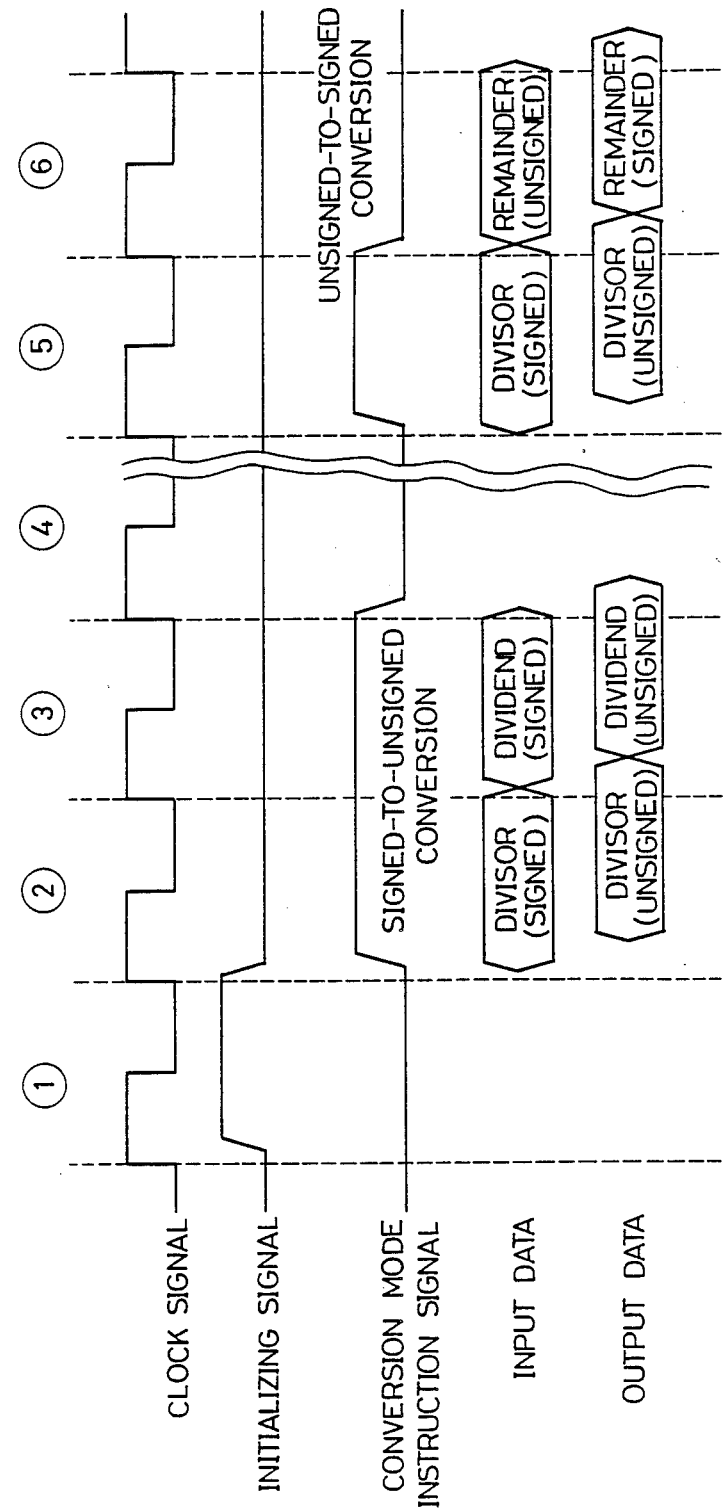
FIG. 6 is a timing chart showing the converting operation of the converting circuit of FIG. 4, in finding a remainder of division.

The converting circuit is put in the signed-to-unsigned conversion mode in a clock cycle ⑤ shown in FIG. 6, and a signed divisor is inputted for a second time. If the sign bit of the divisor is 0, a value stored in the flip-flop 11 will not be changed while, if the sign bit is 1, the value in the flip-flop 11 will be inverted. As a result, as shown in a column 5 of FIG. 7, the value of the flip-flop 11 will be equal to a value of the sign bit of a dividend. According to the value of the sign bit, the divisor is outputted as it is, or a two's complement of the divisor data is outputted. However, the outputted data is ignored.

In the next clock cycle ⑥, the converting circuit is put in the unsigned-to-signed conversion mode, and an unsigned remainder is inputted. Similar to the case of the quotient, the inputted remainder is outputted as it is if the value of the flip-flop 11 is 0 and, if the flip-flop is 1, a two's complement of the remainder is outputted.

Although the conversion operation for finding only a quotient or a remainder has been explained, both the quotient and remainder can be found by continuously executing the conversion operation on the quotient and remainder to consecutively convert the unsigned quotient and remainder into signed numbers.

A conversion operation related to multiplication can be executed in a manner similar to that of finding a quotient of division.

Figure 9:
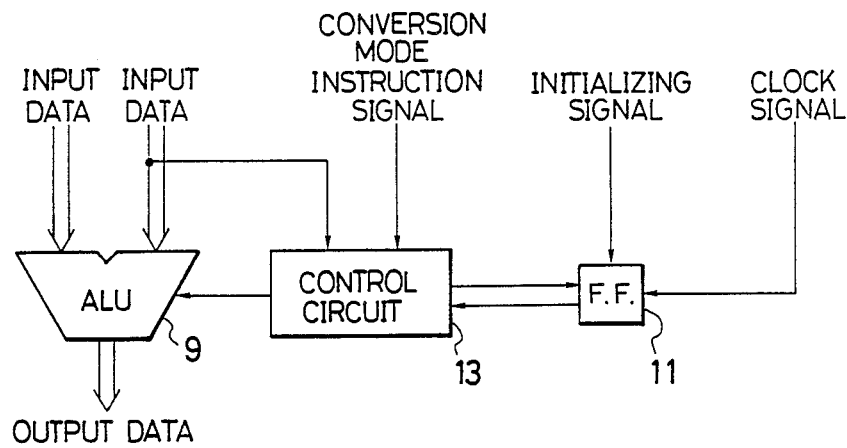
FIG. 9 is a view showing another embodiment of the present invention in which an arithmetic logic operation unit is used instead of an adder adopted in the embodiment of FIG. 4.

In the above embodiment, an adder has been used to output an input signal of n bits as it is, or to output a two's complement of the input signal. This adder may be replaced with another device, if the device has the same function as that of the adder. For example, as shown in FIG. 9, a standard arithmetic logic operation unit (ALU) which executes arithmetic and logic operation with respect to a plurality of input data may be used.

Figure 10:
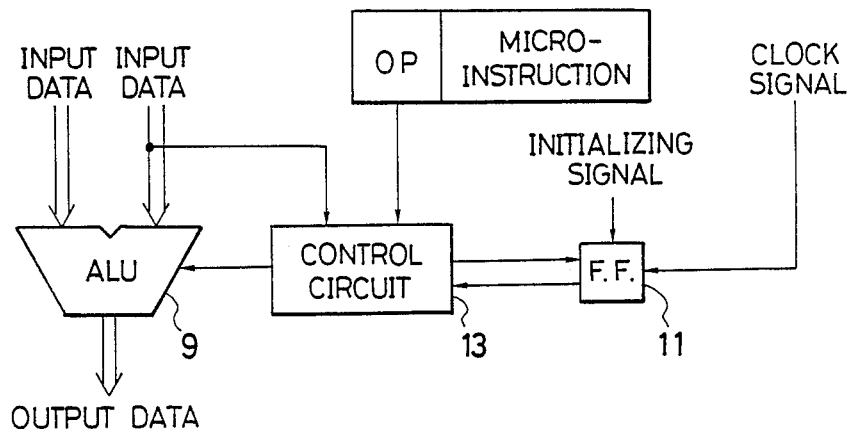
FIG. 10 is a view showing still another embodiment of the present invention in which a microinstruction is used instead of a conversion mode instruction signal of FIG. 4 to control a control circuit.

The control circuit 13 may be controlled with a microprogram such that the conversion mode instruction signal is given to the control circuit 13 as a code of an operation field of a microinstruction, as shown in FIG. 10. In this case, the code of the operation field will be satisfactory if it can specify the two converting operations, i.e., the signed-to-unsigned and unsigned-to-signed conversion operations so that the operation field code is needed to have only one bit.

Various modifications will become possible for those skilled in the art after receiving the teachings of the present disclosure without departing from the scope thereof.

What is claimed is:

1. A circuit for converting a format of numeric data, comprising:
    operation means for outputting one of an input numeric data and a two's complement of the input numeric data according to a mode decision signal;
    storage means for storing a positive or negative sign data to be read out, said storage means being reset to a positive sign data storing state by an initializing signal; and
    control means having two operation modes,
    one of the operation modes being a signed-to-unsigned conversion mode under which said control means controls said operation means with the mode decision signal such that, if a sign bit of the input numeric data is 0, said operation means outputs the input numeric data while, if the sign bit is 1, said operation means calculates and outputs a two's complement of the input numeric data, and, under the same signed-to-unsigned conversion mode with the above-mentioned sign bit being 1, said control means inverting the sign data stored in said storage means, and
    the other of the two operation modes being an unsigned-to-signed conversion mode under which said control means controls said operation means with the mode decision signal such that, if the sign data stored in said storage means is positive, said operation means outputs the input numeric data while, if the sign data stored in said storage means is negative, said operation means outputs a two's complement of the input numeric data.

2. The circuit as claimed in claim 1, wherein said control means is put in the signed-to-unsigned conversion mode to input a signed numeric data to said operation means and convert the signed numeric data into an unsigned number.

3. The circuit as claimed in claim 1, wherein said control means is put in the unsigned-to-signed conversion mode to input an unsigned quotient or an unsigned product to said operation means and convert the unsigned quotient or the unsigned product into a signed number.

4. The circuit as claimed in claim 1, wherein said control means is firstly put in the signed-to-unsigned conversion mode to input a divisor to said operation means, then in the unsigned-to-signed conversion mode to input a remainder to said operation means and convert the remainder into a signed number.

5. The circuit as claimed in claim 1, wherein said operation means is an adder having an input of N bits and an output of N bits.

6. The circuit as claimed in claim 1, wherein said storage means is a flip-flop circuit.

7. The circuit as claimed in claim 1, wherein said operation means is an arithmetic logic operation means capable of executing arithmetic and logic operations with respect to input data.

8. The circuit as claimed in claim 1, wherein said control means is put in the unsigned-to-signed conversion mode or in the signed-to-unsigned conversion mode according to a conversion mode instruction signal to be sent through a single line.

9. The circuit as claimed in claim 1, wherein said control means is put in the unsigned-to-signed conversion mode or in the signed-to-unsigned conversion mode according to a microinstruction operation code.

10. A circuit for converting a format of numeric data, comprising:
    operation means for outputting one of an input numeric data and a two's complement of the input numeric data according to a mode decision signal,
    storage means for storing a positive or negative sign data to be read out, said storage means being reset to a positive sign data storing state by an initializing signal; and
    control means having two operation modes,
    one of the operation modes being a signed-to-unsigned conversion mode under which said control means controls said operation means with the mode decision signal such that, if a sign bit of the input numeric data is 0, said operation means outputs the input numeric data while, if the sign bit is 1, said operation means calculates and outputs a two's complement of the input numeric data, and, under the same signed-to-unsigned conversion mode with the above-mentioned sign bit being 1, said control means inverting the sign data stored in said storage means, the other of the two operation modes being an unsigned-to-signed conversion mode under which said control means controls said operation means with the mode decision signal such that, if the sign data stored in said storage means is positive, said operation means outputs the input numeric data while, if the sign data stored in said storage means is negative, said operation means outputs a two's complement of the input numeric data, said control means being put in the signed-to-unsigned conversion mode to input a signed numeric data to said operation means and convert the signed numeric data into an unsigned number, said control means being put in the unsigned-to-signed conversion mode to input an unsigned quotient or an unsigned product to said operation means and convert the unsigned quotient or the unsigned product into a signed number, and said control means being firstly put in the signed-to-unsigned conversion mode to input a divisor to said operation means, then in the unsigned-to-signed conversion mode to input an unsigned remainder to said operation means and convert the unsigned remainder into a signed number.

* * * * *